United States Patent [19]

Sundstrom et al.

[11] Patent Number: 6,137,470

[45] Date of Patent: Oct. 24, 2000

[54] TASK MANAGER AND TASK SUPPORT WINDOWS

[75] Inventors: Gunilla A. Sundstrom, Beverly, Mass.; Anthony C. Salvador, Beaverton, Oreg.; Thomas F. Mertzig, Manchester, N.H.

[73] Assignee: GTE Laboratories Incorporated, Waltham, Mass.

[21] Appl. No.: 08/138,650

[22] Filed: Oct. 18, 1993

[51] Int. Cl.[7] .................................................. H09G 1/06
[52] U.S. Cl. .......................... 345/133; 345/118; 345/112
[58] Field of Search ................... 364/514, 281.3, 364/281.4, 281.5, 281.6, 281.7, 281.8; 395/155, 156, 157, 158, 159, 160, 650

[56] References Cited

U.S. PATENT DOCUMENTS

| | | | |
|---|---|---|---|
| 4,823,280 | 4/1989 | Mailandt et al. | 364/514 |
| 4,860,111 | 8/1989 | Shimizu et al. | 364/514 |
| 5,363,315 | 11/1994 | Weiss et al. | 364/514 |

*Primary Examiner*—Thomas R. Peeso
*Attorney, Agent, or Firm*—Leonard Charles Suchyta; Floyd E. Anderson

[57] ABSTRACT

The Task Manager Window is a computer software component used in real-time telecommunications network monitoring and maintenance. The Task Manager Window organizes and presents to a network operator, a user of a decision support system, task packages corresponding to events of possible concern in a telecommunications network. These task packages organize, contain and allow access to all information relevant to resolution of a particular network problem.

9 Claims, 6 Drawing Sheets

TASK MANAGER AND TASK SUPPORT WINDOWS

FIELD OF THE INVENTION

The disclosed invention relates generally to a computer system having a windowing environment for control and monitoring of operational tasks, and more particularly to a computer system for control and monitoring of operational tasks which consist of a grouping of individual events in a telecommunications environment wherein a network operator, responsible for controlling the network, may configure and manipulate the tasks rather than the underlying individual information.

BACKGROUND OF THE INVENTION

The current public switched telephone network employs thousands of switches, multiplexors, and other telecommunications devices that must work in concert in order to provide for the connection and completion of the ordinary telephone call. Many of these devices provide for status information which is sent back over the network to control centers regarding the health of the network.

Different methods have been utilized in the past to present information from telecommunications network equipment to a network operator who is responsible for monitoring and controlling the operation of that equipment. The most common of these methods used computers that provide information to the network operator, responsible for controlling the network, in a simple text-based presentation of the equipment activity as provided by the equipment manufacturer. The presentations are typically chronological reports of equipment activity which may not be relevant to the network operators needs. Moreover, a network operator is unable to tailor the presentation to address new needs corresponding to a changed operational environment.

Further, historical information is not available in concert with real-time information, and in some systems historical information is not available at all.

In another approach, telecommunication network maintenance and monitoring is addressed with the use of a computer support system, typically using computer displays called "awareness screens" or "alarm monitors." The computer support system extracts information available from the telecommunications equipment and delivers it to a network operator on a computer display. However, these displays are inflexible, in -that a network operator cannot tailor the display for the assessment of the current problem. Again, historical and real-time information is not combined.

This inflexibility presents difficulties for the network operator in that he has to look for information about events in different locations and manually, perhaps on paper, combine the different information in order to understand the complete picture.

Additionally, there are currently no existing techniques for providing telecommunication operators or network operators with the ability to group certain information regarding the status of the telecommunications network into packages called tasks and provide for a common location for retrieval and viewing on a computer display. The information must be grouped according to its relevancy to the problem at hand, and may change dynamically over time.

What is desirable is single, common presentation of all pertinent information, whether real-time or historical, for dynamically controlling a telecommunications operating environment that dynamically allows a network operator to group or combine relevant information in a task package and manipulate that package as a whole rather than the underlying information.

OBJECTS OF THE INVENTION

Accordingly, it is a primary of this invention to obviate the above noted and other disadvantages of the prior art.

It is a further object of the invention to provide a novel means of grouping relevant information about the status of a telecommunications network into task packages while displaying the task information in a highly ergonomic fashion.

It is a further object of the invention to provide for a means of selectively tailoring diverse information for grouping into task packages for presentation on a computer display.

It is a still further object of the invention to provide for a means of selecting and grouping both historical and real-time information into task packages for presentation on a computer display.

SUMMARY OF THE INVENTION

In one aspect of the invention, the Task Manager Window allows the presentation of information relating to the operation of a telecommunications network in a task-based fashion. Tasks group together information into a single structure for easier access. Further, the network operator can access all information that is associated with a task from a single display window.

In another embodiment of the invention, the Task Support Window allows for the manipulation of tasks consisting of individual events of information and provides a way of working with several pieces of information simultaneously rather than single pieces of information in a sequential fashion. Advantageously, network operators can access all the information associated with a task at the same time, thus limiting the effort required to locate information relevant to their current activities. Network operators do not need to tediously search for all the bits and pieces of information that need to be processed to solve a particular problem.

DETAILED DESCRIPTION OF THE INVENTION

The present invention is embodied as a computer program running on a conventional computer system. This computer system includes a processing unit, internal memory for storing instructions to be executed by the processing unit, external memory for storing the computer program of the invention and informational data, and a computer display for presenting the computer screens of the instant invention. The computer system further comprises a telecommunications capability for communicating with external telecommunications devices such as telephone switches, multiplexes, and the like. As will become apparent in the following description, information from these telecommunications devices is processed by the computer program of the instant invention in order to present information for monitoring and controlling these devices.

One of ordinary skill in the art will readily understand how to create the computer program of the invention from the description herein.

Figure 1:
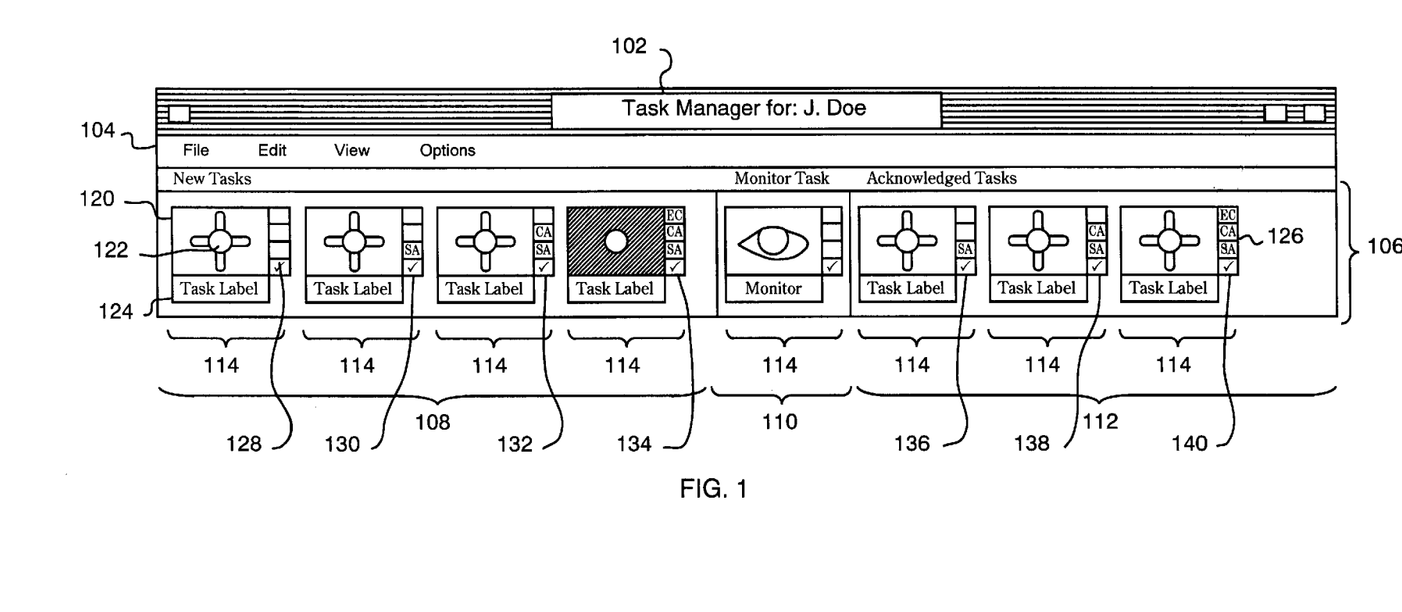
FIG. 1 is a depiction of the Task Manager display show exemplary task icons.

The Functionally of the Task Manger window is explained below with reference to FIG. 1.

The portion of the Task Manager window indicated by numeral 102 corresponds to the Title Bar of the Task Manger Window. The Title Bar indicates:

1. This is the Task Manger Window
2. The identity of the network operator operating the Window Menu bar 104 allows a network operator to select the File, Edit, View and Options operations. Each of these menus is described below.

Figure 2:
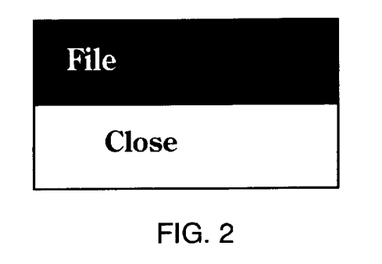
FIG. 2 is a depiction of the file pop up menu illustrating that the network operator can open or close a particular Task Manager window.
Figure 3:
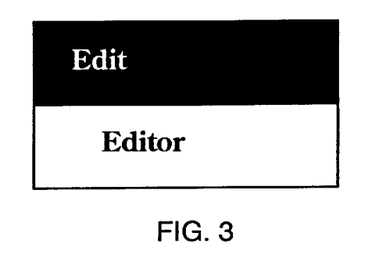
FIG. 3 is a depiction of the edit pop up menu allowing the network operator to edit the Task Manager window.
Figure 4:
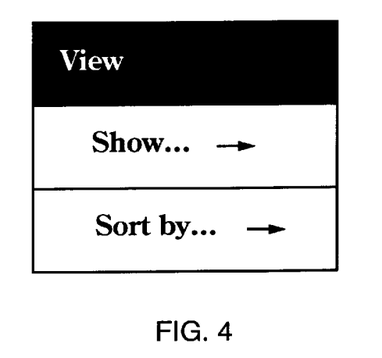
FIG. 4 is a depiction of the view pop up menu allowing the network operator to decide whether certain events are to be displayed by the Task Manager.

The file menu, shown in FIG. 2, illustrates that the network operator can open or close a particular Task Manager Window. With the Edit menu, shown in FIG. 3, a network operator can open the Task Manager Window Editor, which is a separate software component used to edit the content of the Task Manager Window. The View menu as shown in FIG. 4. allows network operators to decide whether certain items are to be displayed in the Task Manager window, and can sort the contents of the Task Manager Window.

Figure 5:
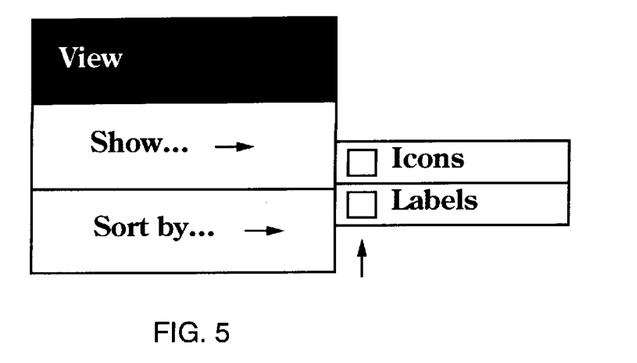
FIG. 5 is a depiction of a cascading view pop up menu allowing the network operator to view or sort events by label or icon.

After selecting the Show option in the View Menu, a second, cascading menu appears to the right of the arrow, as shown in FIG. 5. Through the use of a pointing device, a network operator can click on the options in the cascading portion of the menu (i.e., Icons and Labels). When the network operator clicks on the options, a box to the left of the option appears and disappears. When the box is present, the option is "turned on" in the Task Manager Window. When the box is not present, the option is turned off in the Task Manager Window.

Figure 6:
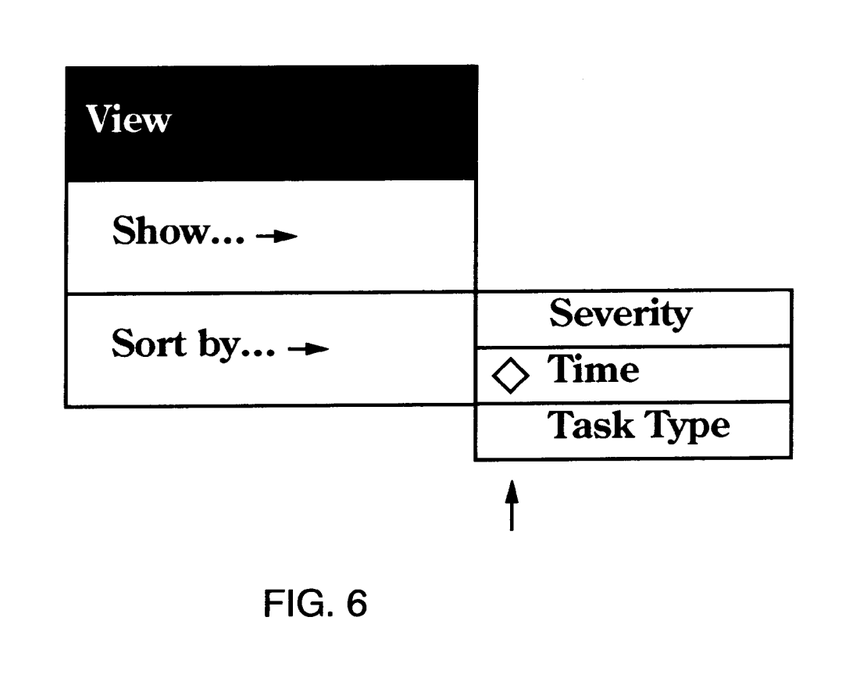
FIG. 6 is a further depiction of a cascading view pop up menu allowing the network operator to view or sort events by severity level, time of occurence, or task type.

A second View Menu is the Sort by menu option, shown in FIG. 6. Selecting the Sort by menu option, a second, cascading menu appears showing the characteristics of the information on which the tasks can be sorted in the Task Manager Window. Tasks in the Task Manager Window can be sorted according to one of the three following criteria. First, tasks can be sorted according to a severity level which is indicated by the color of the icon representing each task of the Task Manager Window, as is further described below. Further, tasks can be sorted according to the time in which they became apparent as tasks by the underlying support system. Tasks can also be sorted by the task type.

Figure 7:
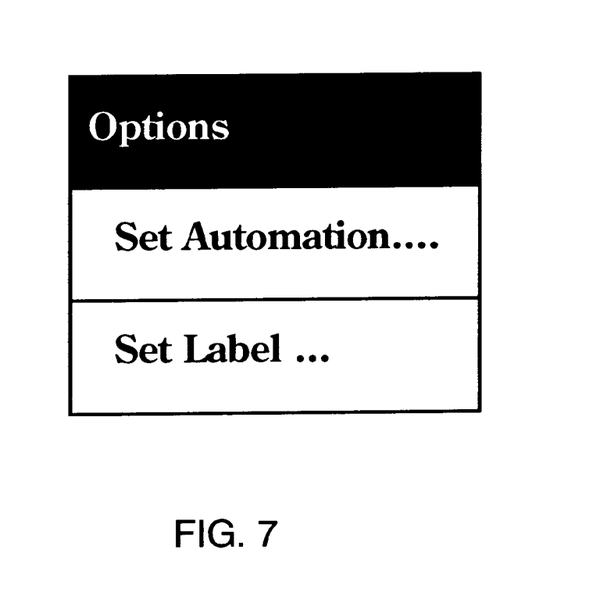
FIG. 7 is a depiction of the options pop up menu allowing the network operator tochoose what tasks will be assigned to automated processes and what tasks will be assigned to network operators for intervention. Further, the Set Label menu option in the Options menu allows network operators to choose a label to depict a task displayed in the Task Manager Window.

The Options menu offers the following functionality as depicted in FIG. 7. The Set Automation menu option in the Options menu allows network operators to choose what tasks will be assigned to automated processes and what tasks will be assigned to network operators for intervention. The Set Label menu option in the Options menu allows network operators to choose a label to depict a task displayed in the Task Manager Window. The concept of a label is described below.

Referring again to FIG. 1, the client area 106 of the Task Manager Window represents through icons the status of current tasks that are being managed. The following status areas are provided for:

1. The New Task area;
2. The Acknowledged Tasks area; and
3. The Monitor area.

The New Task 108 portion of the Task Manager Window shows the icons representing tasks identified by the system, which have not yet been reviewed, or acknowledged, by the network operator. The Acknowledged Task 112 portion of the Task Manager Window shows the icons representing tasks identified by the system or by the network operator which have been reviewed, or acknowledged, by the network operator.

The Monitor Task 110 portion of the Task Manager Window shows the icon representing a unique task named the Monitor Task. The Monitor Task shows all of the information required by the network operator to maintain an overview of the network.

Figure 8:
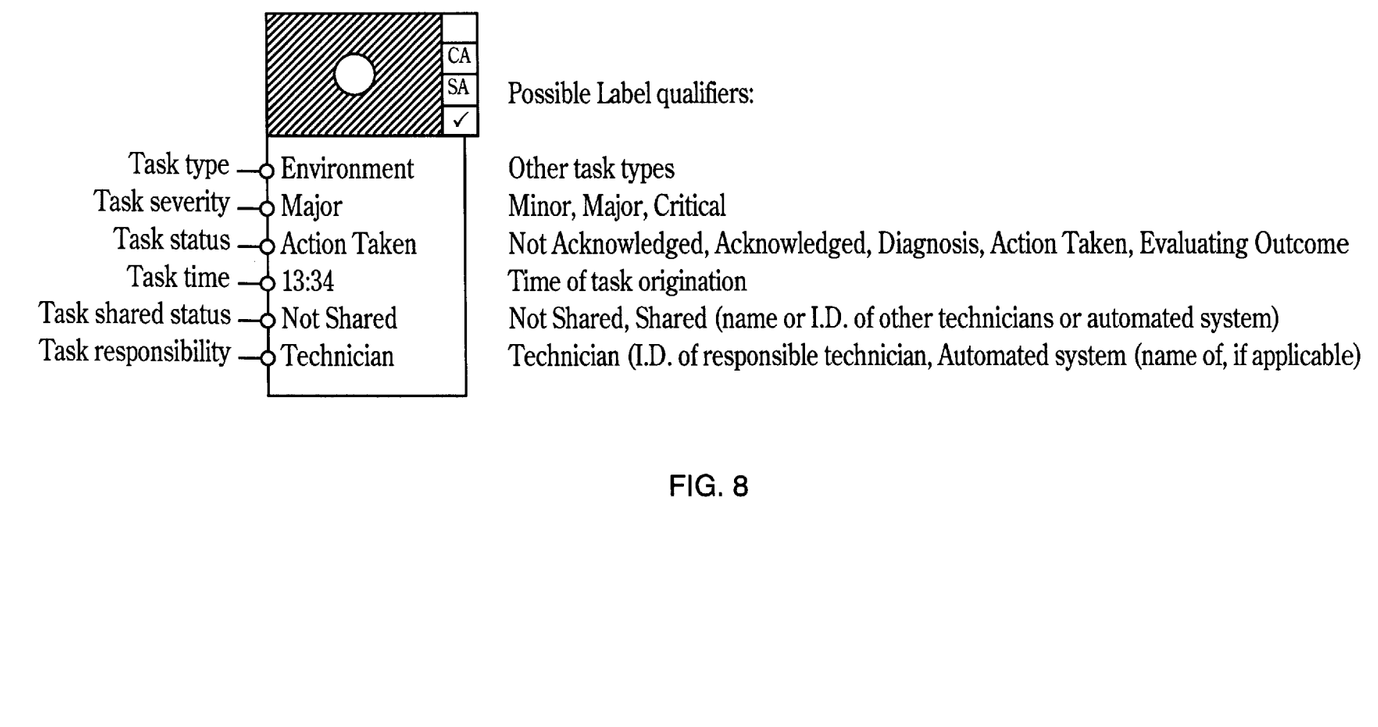
FIG. 8 is a depiction of a task icon showing a descriptive label.

Task icons 114 are now described. The task icon 114 is the visual representation of an information package that comprises the relevant information, analyses and evaluations for a particular type of task. The task icon 114 is comprised of four main components as shown in FIG. 8:

1. The icon background;
2. The task symbol;
3. The task icon label; and
4. The task icon status bar.

Each task icon 114 is configured with the task symbol 122 superimposed over the task icon background 120, and has a label 124 directly beneath the background with the status bar 126 to the right. A task icon has an associated background color which is associated with the severity level assigned to the task. The same color is associated with that task as long as that task appears in the task window and retains the same severity level. Further, the same color is associated with all subsequent windows that appear on the screen as associated with that task.

The task symbol 122 is utilized to represent the task type. The task symbols as used in FIG. 1 are exemplary of any symbol which may be used to indicate tasks of a specific type. However, the tasks, and hence the symbols, are specific to the network that is monitored.

The task icon label 124 is a text representation of the task type. The task icon label indicates any or all of the following fields:

1. Task type;

2. Task severity level;
3. Task status;
4. Task time;
5. Task shared status indicating whether the task is shared with another network operator or with an automated system;, and
6. Task responsibility indicating whether the task has been assigned to an automated system.

These options are depicted in FIG. 8, and explained below.

Task Type is the name associated with a particular type of task. Names are defined by the types of tasks identified during a system configuration process. Task Severity Level indicates the impact this task has or will have on the network. There are three severity classifications, minor, major and critical. Task Status reveals current state of the task. A task can be either not acknowledged or acknowledged. A situation assessment, or diagnosis, may be made, an action may be taken and the outcome of an action may be evaluated.

Task Time indicates the time the task was posted to the Task Manager Window. Task Shared Status represents whether the task has been shared with another network operator, a supervisor, or an automated system, and provides a list of the I.D.'s of the other network operators or supervisors with whom the task is shared. Task Responsibility shows the entity with primary responsibility for resolving this task. Primary responsibility may reside with the network operator who first owned the task, another network operator with whom the task was shared or an automated system. The I.D. of the network operator or supervisor with primary responsibility for the task is shown.

The task icon status bar which indicates the current status of the task in terms of progress toward resolution. There are five possible status levels:

1. not acknowledged;
2. acknowledged;
3. a situation assessment is or was being made;
4. a decision to take an action was or is being made; and
5. the outcome of an action is being or was evaluated.

Status bar 128 shows the "not acknowledged" status level displayed in the task icon status bar. The question mark in the lowest box indicates that the task has been acknowledged by either the network operator or any automated system. It is important to note, that the box represents acknowledgment by either an automated system or the network operator. However, until the network operator reviews the task information package, the task remains in the New Task portion of the client area. In another representative status bar 130 the "Situation Assessment" status level is shown. When in the New Task portion of the client area, the SA symbol indicates that an automated system is assessing or has assessed the current situation related to that task.

Status bar 132 shows the "Choice of Action(s)" level displayed in the task icon status bar. When in the New Task 108 portion of the client area 106, the CA symbol indicates that an automated system is choosing or has chosen an action to take related to that task. Status bar 134 shows the "Evaluation of Outcome" status level displayed in the task icon bar. When in the New Task 108 portion of the client area 106, the EO symbol indicates that an automated system is evaluating or has evaluated the outcome of a chosen action as related to that task. Status bar 136 shows the "Situation Assessment" status level displayed in the task icon status bar with a task that has been acknowledged or reviewed by the network operator. When in the Acknowledged Task portion of the client area, the SA symbol indicates that an automated system or a network operator is assessing or has assessed the current situation related to that task. Status bar 138 shows the "Choice of Action(s)" status level in the task icon status bar associated with a task that has been acknowledged or reviewed by the network operator. When in the Acknowledged Task portion of the client area, the CA symbol indicates that a network operator or an automated system is choosing or has chosen an action to take related to that task. Finally, Status bar 140 shows the "Evaluation of Outcome" status level displayed in the task icon status bar when the task has been acknowledged or reviewed by the network operator. When in the Acknowledged Task portion of the client area, the EO symbol indicates that a network operator or an automated system is choosing or has chosen an action to take related to that task.

While the task manager has been described in relation to the control and operation of a telecommunications network, the concepts and principles described are applicable to many other operations where there is a need to support an computer operator or network operator in a task-based fashion.

Figure 9:
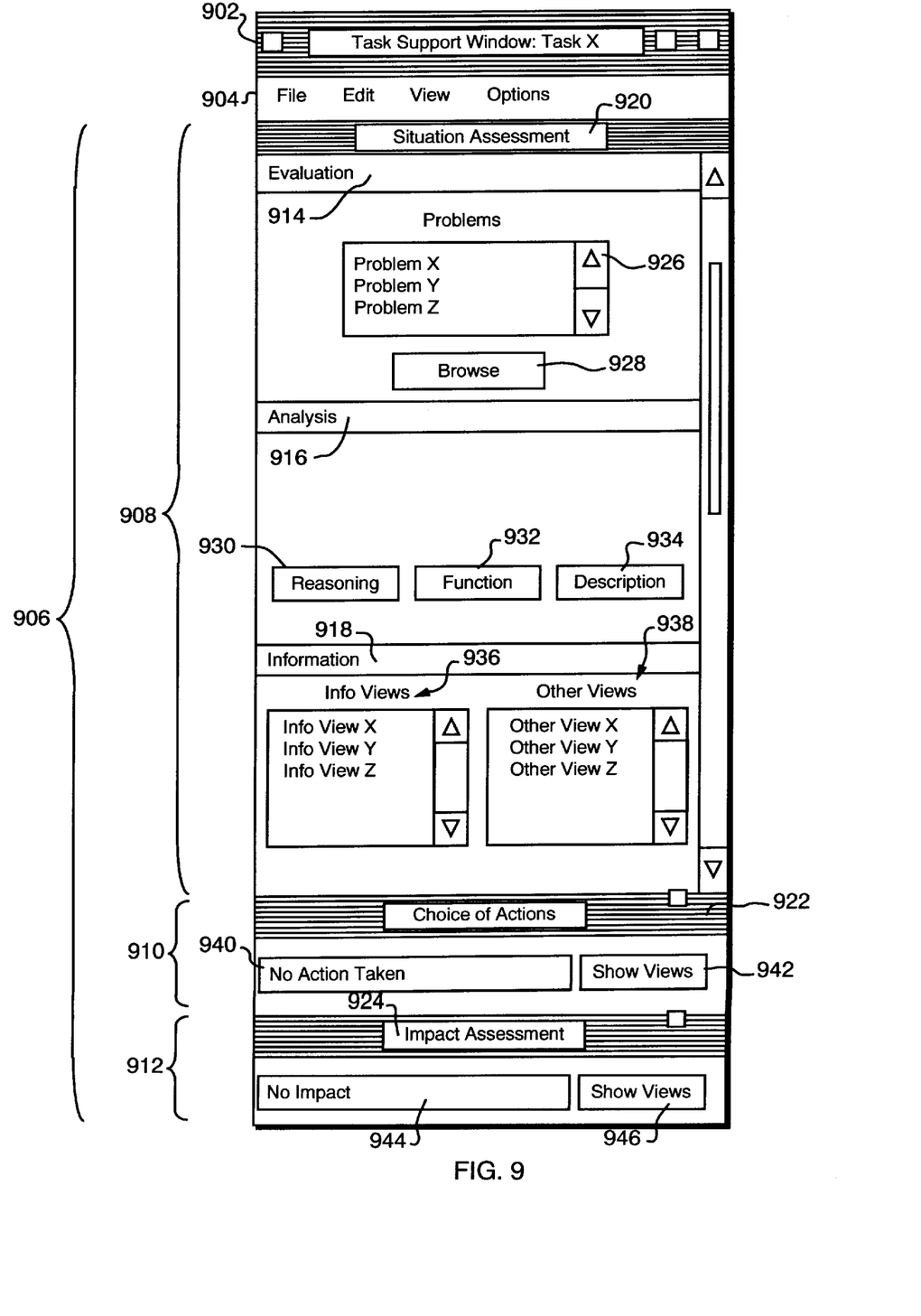
FIG. 9 is a depiction of the Task Support Window.
Figure 10:
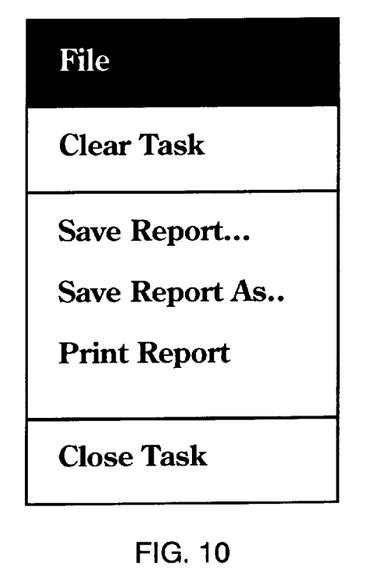
FIG. 10 is a depiction of the file pop up menu within the Task Support Window.

In another embodiment of the invention, the Task Support Manager is now described with reference to FIG. 9.

The Title Bar of the Task Support Window is shown as 902. The Title Bar 902 indicates that the Task Support Window is operating on the behalf of "Task X," a specific task type.

There are four sub menus 904 in the Menu Bar: File, Edit, View, and Options. The functionality provided by each menu option is novel in the context of the Task Support Window. Each of these menus is described below.

Figure 11:
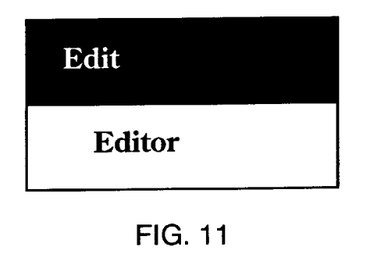
FIG. 11 is a depiction of the edit pop up menu within the Task Support Window.

The file menu, shown in FIG. 11 offers five primary functions for the network operator. The network operator may clear the current task, indicating that the network operator no longer requires the information package associated with this task to appear on the screen. The current information package associated with the task represented by this Task Support Window can be saved as a report with the current task type name. Optionally, the report can be saved providing a name for the report. The report may be printed, and lastly the task can be closed providing that the entire information package associated with this task, including the Task Support Window, will be stored and shown as an icon elsewhere on the screen.

The Edit menu, shown in FIG. 11, allows the network operator to open the Task Support Window Editor, which is used to edit the content of the Task Support Window. The Task Support Window Editor is not described here. With the View menu a network operator can choose the display of the Task Support Window in a horizontal or a vertical orientation.

Figure 12:
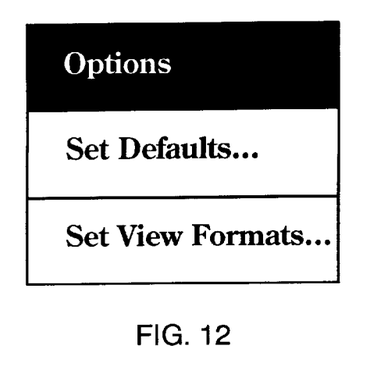
FIG. 12 is a depiction of the options pop up menu within the Task Support Window.

Referring to FIG. 12, the Options menu provides the following functionality. The Set Defaults . . . option in the Options menu allows an operator to set the default window settings for individual windows contained in the Task Support Window. Additionally, the Set View Formats . . . menu option in the Options menu allows network operators to choose how information will be presented within the confines of the Task Support Window.

The client area 906 of the Task Support Window is divided into three main partitions corresponding to Situation Assessment 908, Choice of Actions 910, and Impact Assessment 912. Each of these three main partitions is further divided into three sub-partitions corresponding to Evaluation 914, Analysis 916, and Information 918. The client area retains the background color of the task for which services are provided.

At 920, 922, and 924 the title bar for the Situation Assessment partition, the Choice of Actions partition, and the the Impact Assessment partition are respectively shown. The color of the window may indicate whether the window is currently opened. Through the use of a pointing device, a network operator can click on these title bars and consequently open or close the partitions.

The window for Situation Assessment partition is shown at 908. The window contains an information package necessary to support the network operator's situation assessment activities for the current task. Additionally, information may be accessed through one of three sub-partitions, Evaluation 914, Analysis 916, and Information 918. All of the three primary partitions support these three sub-partitions.

At 914 the Evaluation sub partition is shown. From this sub-partition, underlying support systems provide evaluations of the information collected from the network, and specify possible explanations of the problems encountered. The most likely problem cause appears at the top with additional problem causes appearing in descending order of probability. A scroll bar 926 appears to the right side of the box and allows the network operator to scroll through the window. Additionally, the network operator may open an additional window 928 allowing the network operator to "Browse" through all of the potential problems causes which may be related to the current task but are not listed in the evaluation window.

The Analysis 916 sub partition is now described. From this sub-partition, underlying support systems provide an analyses of the information collected from the network elements. Three types of analysis support are provided:

1. Reasoning
2. Function
3. Description

The Reasoning 930 functionality opens a window that provides an analysis for the explanations provided above in the Explanation window. The Function 932 option opens a window that provides an analysis of the collected information from the network in terms of the function of the presumably faulty network component related to this task. The Description 934 option offers a description of the information relevant to this task.

From the Information 918 sub-partition, a network operator can open assorted views 936 to examine the information package associated with this task. The name of each view appears in the box. If there are more views than will fit in the box, a scroll bar appears to the right side of the box and allows the network operator to scroll through the window. The "Other Views" 938 heading indicates that the content of the box below it contains a list of views that the network operator can access, but are not necessarily related to the task represented in the Task Support Window. The network operator may wish to see these views in the context of the current task. Again the name of each view appears in the box. If there are more views than will fit in the box, a scroll bar appears to the right side of the box and allows the network operator to scroll through the window. The Choice of Actions window 910 is now described.

The Choice of Actions partition 910 provides information necessary to support the network operator's selection of an action to remedy the situation identified in the Situation Assessment partition 908 for the current task. Similar to the Situation Assessment partition, information pertinent to the choice of an appropriate action 940 may be accessed through one of three sub-partitions, When a partition is closed, as shown, none of its sub-partitions are visible. However, a summary of the activity that has taken place within that sub-partition is visible.

If, there was some activity within a closed partition, and some "Info Views" or "Other Views" were opened, then the "Show Views" push button appears to the right of the activity summary. The "Show Views" push button allows the network operator to reopen all of the views that were opened when that partition was opened, without having to reopen that entire partition.

The Impact Assessment partition 912 is now described. This partition contains information to support the network operator's evaluation of an action taken in response to the situation identified in the Situation Assessment partition 908. As in the Situation Assessment 908 and Choice of Action partition 910, information pertinent to the evaluation of the outcome of an action may be accessed through one of three sub-partitions, Evaluation, Analysis, and Information.

When a partition is closed none of its sub-partitions are visible. However, a summary of the activity that has taken place within that sub partition is visible. The case of no activity having occurred is indicated the phrase "No Impact" 944. If, there was some activity within a closed partition, and "Info Views" or "Other Views" were opened, then the "Show Views" option 946 appears to the right of the activity summary. The "Show views" option allows the network operator to reopen all of the views that were opened when that partition was opened without having to reopen that entire partition.

While there has been shown and described what is at present considered the preferred embodiment of the invention it will be obvious to those skilled in the art that various changes and modifications may be made therein without departing from the invention as defined by the appended claims.

What is claimed is:

1. A computer system for monitoring a plurality of tasks composed of one or more events to control devices in a telecommunications network comprising:

input means for receiving said events from devices in the telecommunications network;

grouping means for grouping one or more events into a said task;

display means for graphically presenting said tasks;

selection means coupled to the display means for selecting a subset of said tasks for presentation by the display means.

2. A computer system as recited in claim 1 wherein:

said events include both historical and real time information.

3. A computer system as recited in claim 1 wherein:

said display means graphically presents said events as an icon.

4. A computer system as recited in claim 1 wherein:

said selection means selects events according to the time of the event.

5. A computer system as recited in claim 1 wherein:

said selection means selects events according to the severity level of the event.

6. A computer system as recited in claim 1 wherein:

said selection means selects events according to the source of the event.

7. A computer system as recited in claim 1 wherein:

said display means includes a status bar for determining the extent of task automation.

8. A computer system for monitoring a plurality of tasks composed of one or more events to control devices in a telecommunications network comprising:

processing means for manipulating said tasks;

input means for receiving said events from devices in the telecommunications network;

grouping means for grouping one or more events into a said task;

display means for graphically presenting information of the said tasks in a windowing environment supporting multiple views of the tasks;

selection means coupled to the display means for selecting a subset of said tasks for presentation by the display means;

wherein a plurality of said tasks are manipulated by the processing means concurrently.

9. The computer system as recited in claim 8 wherein the display means is selectively changeable.

* * * * *